(12) United States Patent
Hughes et al.

(10) Patent No.: US 12,545,523 B2
(45) Date of Patent: Feb. 10, 2026

(54) SYSTEM FOR TRANSFERRING CROP MATERIALS FROM A HARVESTER IN A CONFINED AREA OF AN AGRICULTURAL FIELD

(71) Applicants: Travis Hughes, Andover, SD (US); Brandon Alberts, Langford, SD (US)

(72) Inventors: Travis Hughes, Andover, SD (US); Brandon Alberts, Langford, SD (US)

(*) Notice: Subject to any disclaimer, the term of this patent is extended or adjusted under 35 U.S.C. 154(b) by 342 days.

(21) Appl. No.: 18/154,326

(22) Filed: Jan. 13, 2023

(65) Prior Publication Data
US 2024/0239610 A1  Jul. 18, 2024

(51) Int. Cl.
*B65G 33/14* (2006.01)
*A01D 90/10* (2006.01)

(52) U.S. Cl.
CPC ............ *B65G 33/14* (2013.01); *A01D 90/10* (2013.01); *B65G 2201/0202* (2013.01)

(58) Field of Classification Search
CPC ........ B65G 33/14; B65G 33/22; A01D 90/10; A01D 41/1217; B60P 1/40
USPC ....................................................... 414/526
See application file for complete search history.

(56) References Cited

U.S. PATENT DOCUMENTS

| | | | | |
|---|---|---|---|---|
| 804,511 A * | 11/1905 | Winters | ................... | F21V 21/26 285/264 |
| 2,456,744 A * | 12/1948 | Sjoberg | ............... | F16L 37/1205 285/55 |
| 2,783,907 A * | 3/1957 | Hudgins | ............ | A01D 41/1217 414/505 |
| 3,241,657 A | 3/1966 | Buschbom | | |
| 3,348,706 A * | 10/1967 | Hyman | .................... | A01F 12/60 56/473.5 |
| 4,988,240 A * | 1/1991 | Thompson | ............. | B65G 53/52 406/173 |
| 5,305,866 A * | 4/1994 | Stewart | .................. | B65G 65/22 198/314 |
| 5,409,344 A * | 4/1995 | Tharaldson | ............... | B60P 1/42 D15/27 |
| 5,443,352 A | 8/1995 | Schuhmacher | | |

(Continued)

FOREIGN PATENT DOCUMENTS

WO  WO-2021144631 A1 * 7/2021 ......... A01D 41/1217

*Primary Examiner* — Joseph A Dillon, Jr.
(74) *Attorney, Agent, or Firm* — Jeffrey A. Proehl; Woods, Fuller, Shultz & Smith, PC

(57) ABSTRACT

A harvesting system may include a harvester apparatus defining an onboard storage structure and having a primary movement direction, and including a harvesting head and a crop material conveying structure for conveying the crop materials from the storage structure to a crop transporting vehicle. The conveying structure may have an auger assembly with an inboard end and an outboard end, and a dispensing spout at the outboard end. The auger assembly may include an inboard portion located toward the inboard end and an outboard portion located toward the outboard end, the outboard portion being movable with respect to the inboard portion. The outboard portion may be movable with respect to the inboard portion between a base position and a discharge position, and interiors of the inboard and outboard portions may be in communication with each other in at least the base and discharge positions of the outboard portion.

23 Claims, 10 Drawing Sheets

(56) References Cited

U.S. PATENT DOCUMENTS

| | | | | |
|---|---|---|---|---|
| 6,767,174 | B2* | 7/2004 | Cresswell | B60P 1/42 |
| | | | | 414/526 |
| 7,367,881 | B2 | 5/2008 | Voss | |
| 7,644,816 | B2* | 1/2010 | Veiga Leal | A01D 41/1217 |
| | | | | 56/16.6 |
| 8,033,377 | B2* | 10/2011 | Reimer | A01D 41/1217 |
| | | | | 198/313 |
| 9,061,834 | B2* | 6/2015 | Mulder | B65G 33/08 |
| 9,604,785 | B1* | 3/2017 | Gaerke | B65G 11/126 |
| 9,609,805 | B2* | 4/2017 | Linde | A01F 12/46 |
| 9,901,030 | B2* | 2/2018 | Matousek | A01D 41/1208 |
| 11,524,415 | B2* | 12/2022 | Nighswander | F16M 11/14 |
| 2003/0101704 | A1* | 6/2003 | Johnson | A01D 41/1208 |
| | | | | 56/100 |
| 2003/0175102 | A1* | 9/2003 | Cresswell | B60P 1/42 |
| | | | | 414/526 |
| 2007/0191080 | A1* | 8/2007 | Voss | A01D 41/1217 |
| | | | | 460/114 |
| 2010/0009731 | A1* | 1/2010 | Coers | A01D 41/1217 |
| | | | | 460/149 |
| 2013/0096782 | A1* | 4/2013 | Good | A01D 41/1217 |
| | | | | 701/50 |
| 2017/0142899 | A1* | 5/2017 | Matousek | A01D 41/1208 |
| 2019/0037774 | A1* | 2/2019 | Farley | A01F 12/46 |
| 2023/0072267 | A1* | 3/2023 | Lensch | A01F 12/46 |
| 2025/0024785 | A1* | 1/2025 | Linde | A01D 61/004 |

\* cited by examiner

SYSTEM FOR TRANSFERRING CROP MATERIALS FROM A HARVESTER IN A CONFINED AREA OF AN AGRICULTURAL FIELD

BACKGROUND

Field

The present disclosure relates to harvesting apparatus and more particularly pertains to a new system for transferring crop materials from a harvester in a confined area of an agricultural field.

SUMMARY

In one aspect, the present disclosure relates to a harvesting system for harvesting and removing crop materials from an agricultural field having a ground surface. The system may comprise a harvester apparatus movable over the ground surface of the field for harvesting crop materials from the field. The harvester apparatus may define an onboard storage structure and have a primary movement direction. The harvester apparatus may also include a crop material conveying structure for conveying the crop materials from the onboard storage structure to a crop transporting vehicle. The conveying structure may have an auger assembly elongated along a longitudinal axis with an inboard end and an outboard end, and the auger assembly may include a dispensing spout at the outboard end. The auger assembly may include an inboard portion located toward the inboard end and an outboard portion located toward the outboard end. The outboard portion may be movable with respect to the inboard portion between a base position and a discharge position, and interiors of the inboard and outboard portions may be in communication with each other in at least the base and discharge positions of the outboard portion.

In another aspect, the present disclosure relates to a conveying structure for conveying particulate material, and the conveying structure may comprise an auger assembly elongated along a longitudinal axis with an inboard end and an outboard end, with a dispensing spout at the outboard end. The auger assembly may include an inboard portion located toward the inboard end and an outboard portion located toward the outboard end, with each of the inboard and outboard portions having a central axis. Each of the inboard and outboard portions of the auger assembly may include an auger tube and an auger positioned in the auger tube, with the auger of the outboard portion being connected to the inboard portion such that rotation of the auger of the inboard portion is transferred to the auger of the outboard portion. The outboard portion may be pivotable with respect to the inboard portion between a base position and a discharge position. The base position may be characterized by the central axes of the inboard and outboard portions being substantially parallel to each other, and the discharge position being characterized by the central axes of the onboard and outboard portions being oriented at an oblique angle with respect to each other. Interiors of the inboard and outboard portions may be in communication with each other in at least the base and discharge positions of the outboard portion.

In yet another aspect, the present disclosure relates to a method of unloading crop materials from a harvester apparatus. The method may include operating the harvester apparatus to fill onboard storage of the harvester apparatus along a path across a ground surface of a field, with the path being oriented substantially parallel to rows of plants growing in the field and the path being between plants growing in the field such that plants are upstanding at both lateral ends of a harvester head of the harvester apparatus. The method may include positioning a hopper in a position in the field alongside the harvester apparatus rearward of the harvester head of the harvester apparatus, pivoting an outboard portion of an auger assembly from a base position of the outboard portion upwardly to a discharge position of the outboard portion, and swinging the auger assembly outwardly from a folded condition to an intermediate condition. The method may further include dispensing crop materials from the harvester apparatus by operating the auger assembly to transfer crop materials from the auger assembly to the hopper, swinging the auger assembly inwardly from the intermediate condition to the folded condition of the auger assembly, and pivoting the outboard portion of the auger assembly from the discharge position of the outboard portion downwardly to the base position of the outboard portion.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
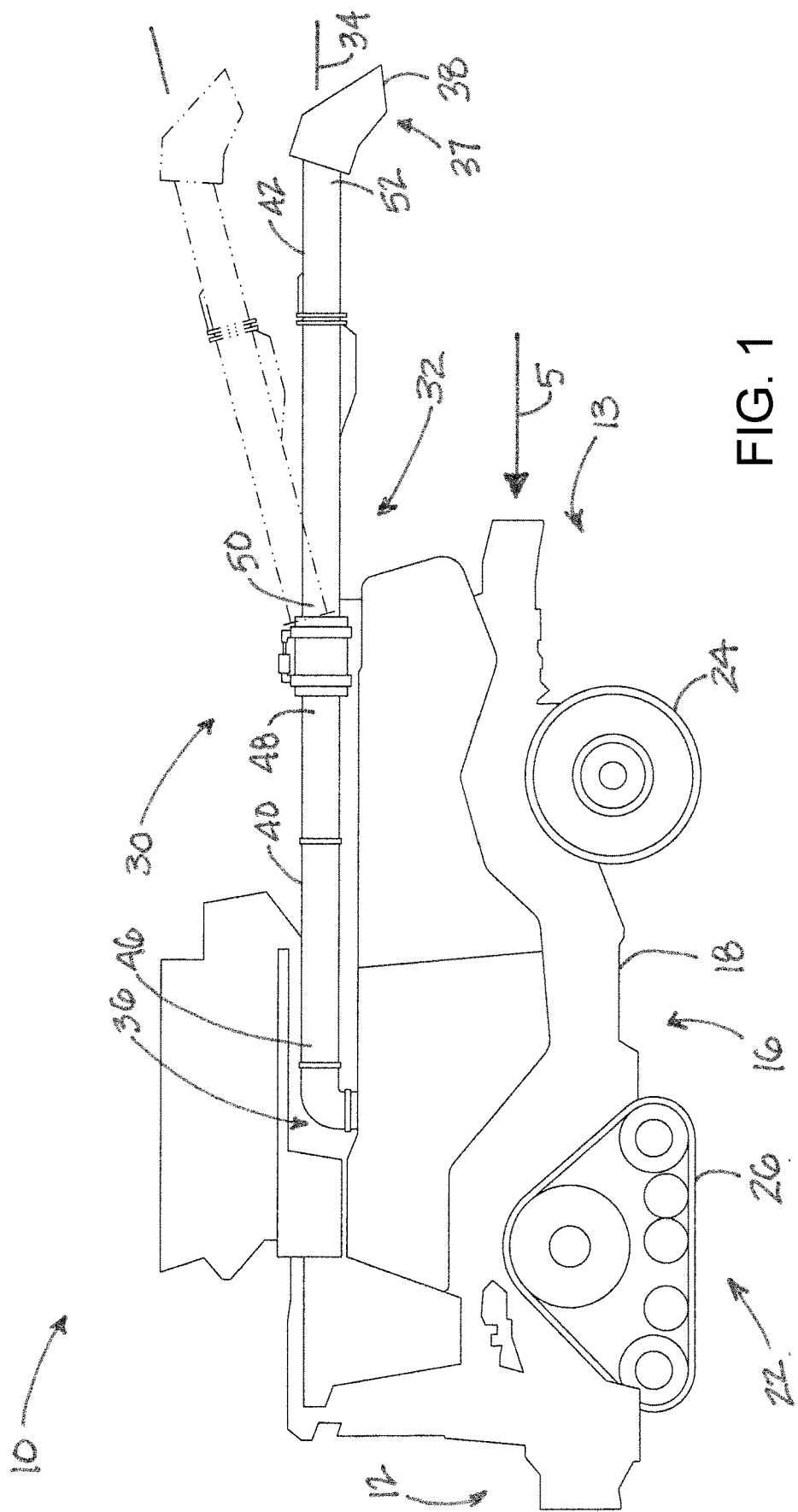
FIG. 1 is a schematic side view of a new system for harvesting crop materials in an agricultural field according to the present disclosure.
Figure 2:
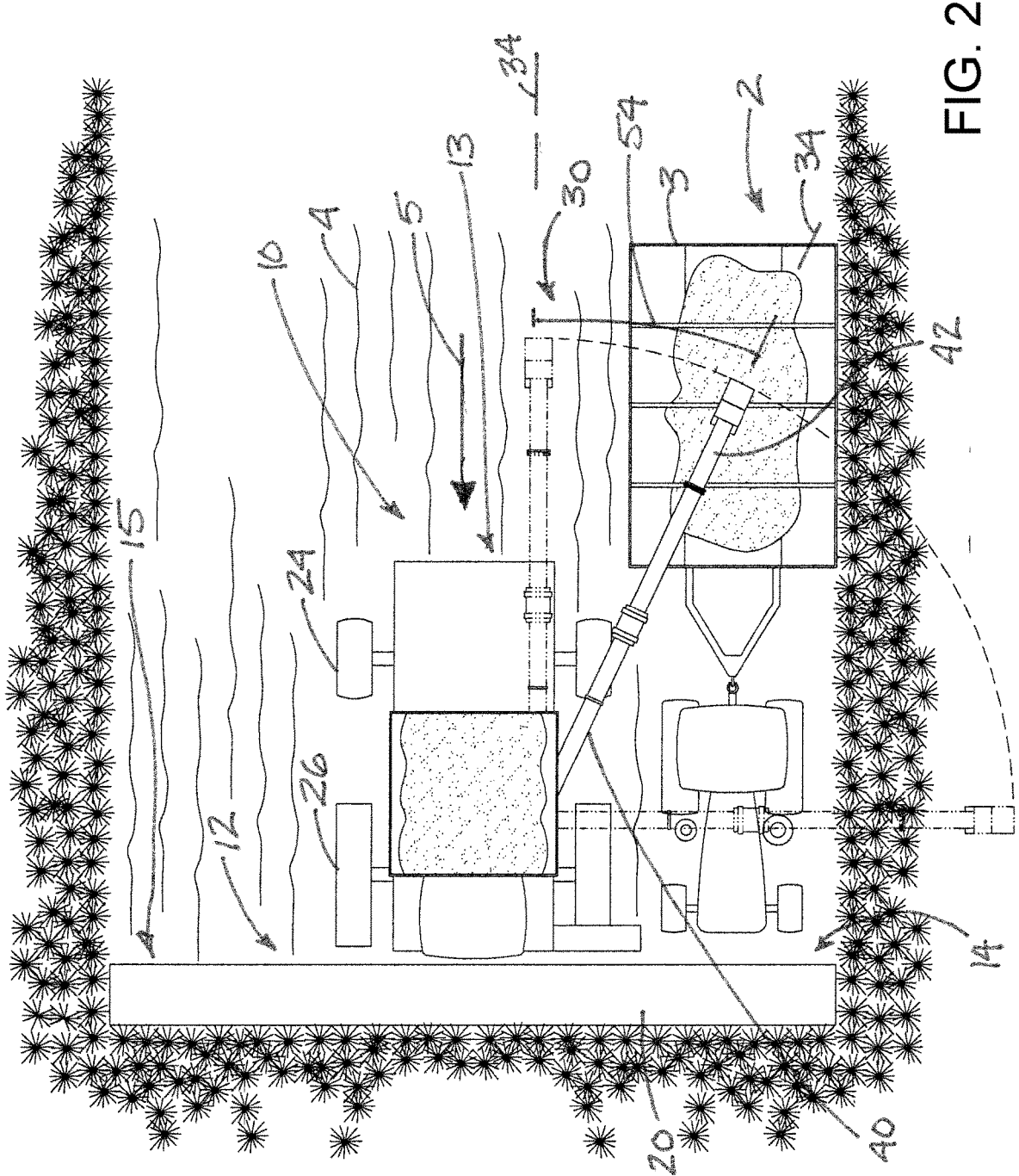
FIG. 2 is a schematic top view of the system shown positioned in an agricultural field with standing plants of a crop, showing the auger assembly in an intermediate condition in solid lines and in the folded and unfolded conditions in broken lines, according to an illustrative embodiment.
Figure 3:
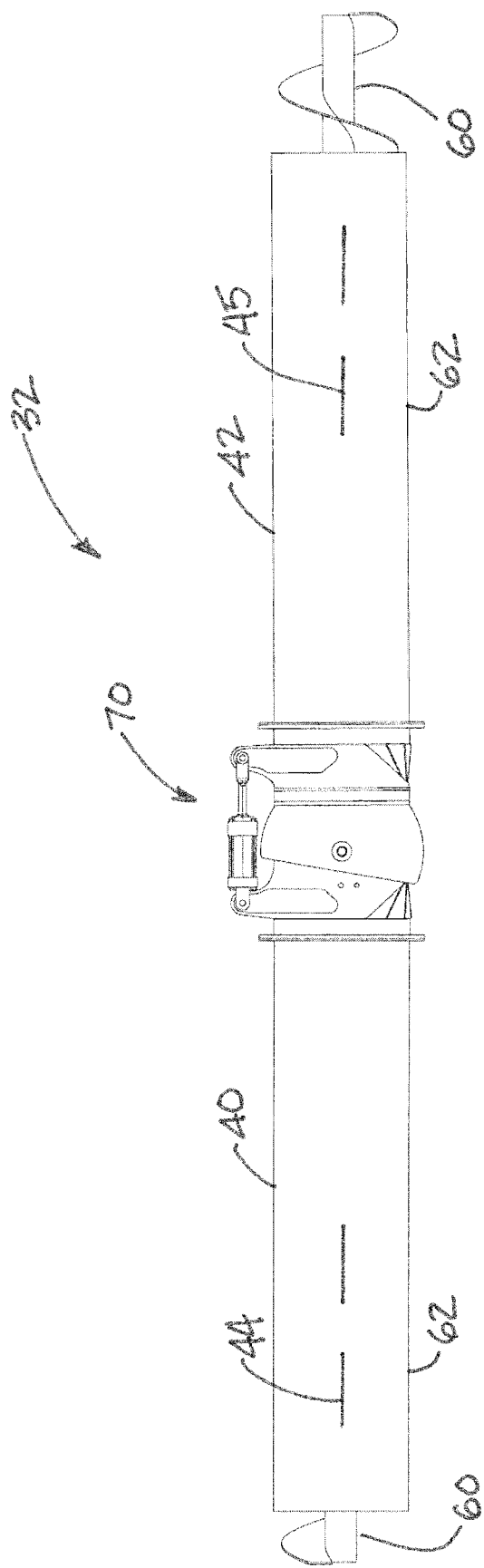
FIG. 3 is a schematic side view of a portion of the auger assembly shown in a base position, according to an illustrative embodiment.
Figure 4:
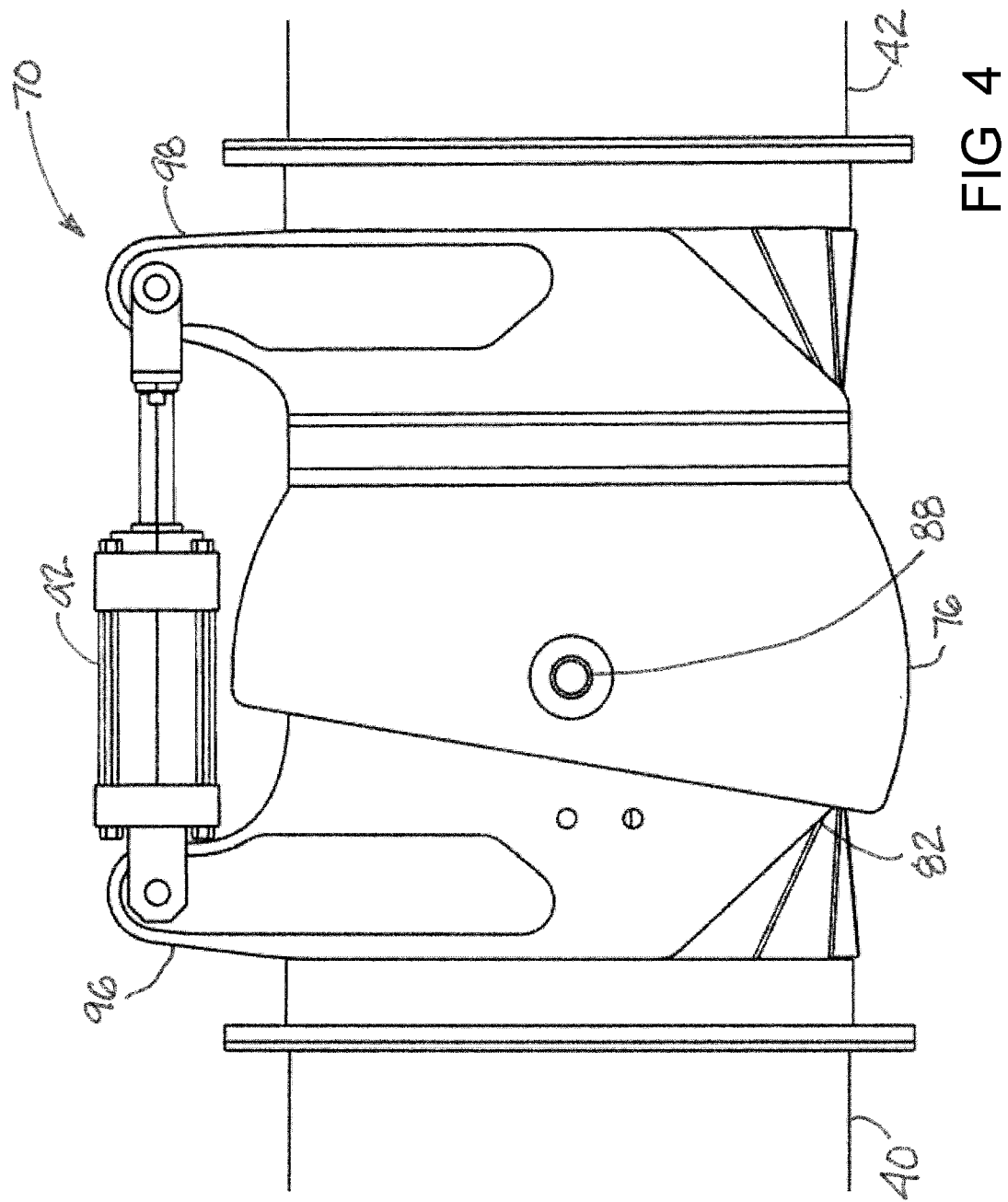
FIG. 4 is a schematic side view of an enlarged portion of the auger assembly and the pivot joint structure in the base position, according to an illustrative embodiment.
Figure 5:
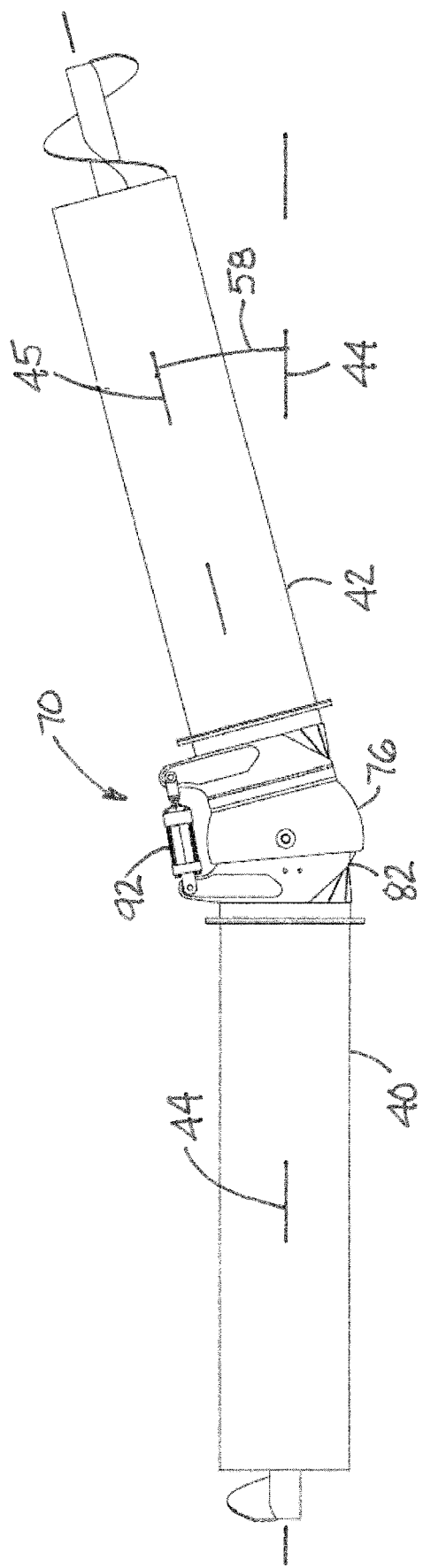
FIG. 5 is a schematic side view of a portion of the auger assembly shown in a discharge position, according to an illustrative embodiment.
Figure 6:
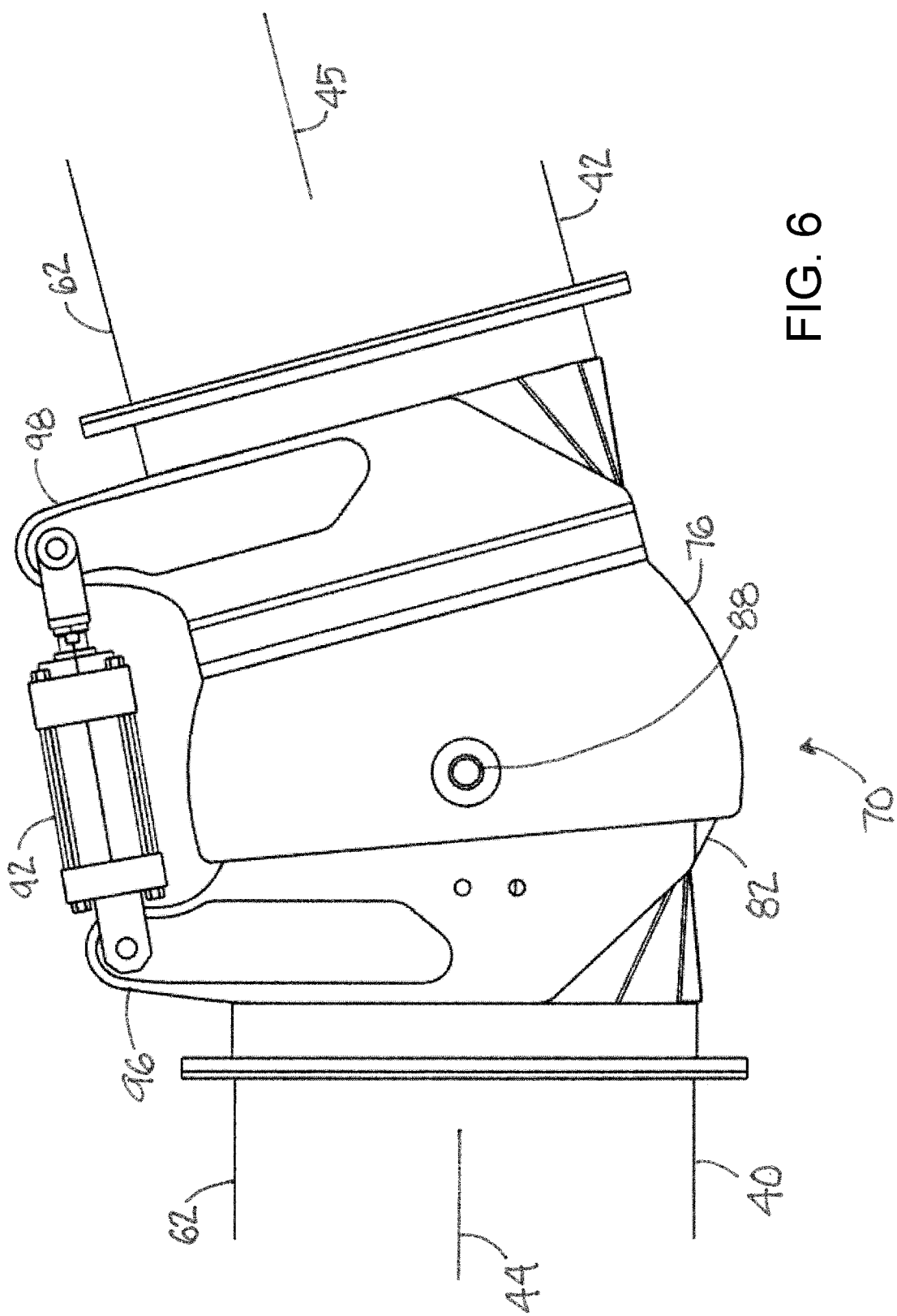
FIG. 6 is a schematic side view of an enlarged portion of the auger assembly and the pivot joint structure in the discharge position, according to an illustrative embodiment.
Figure 7:
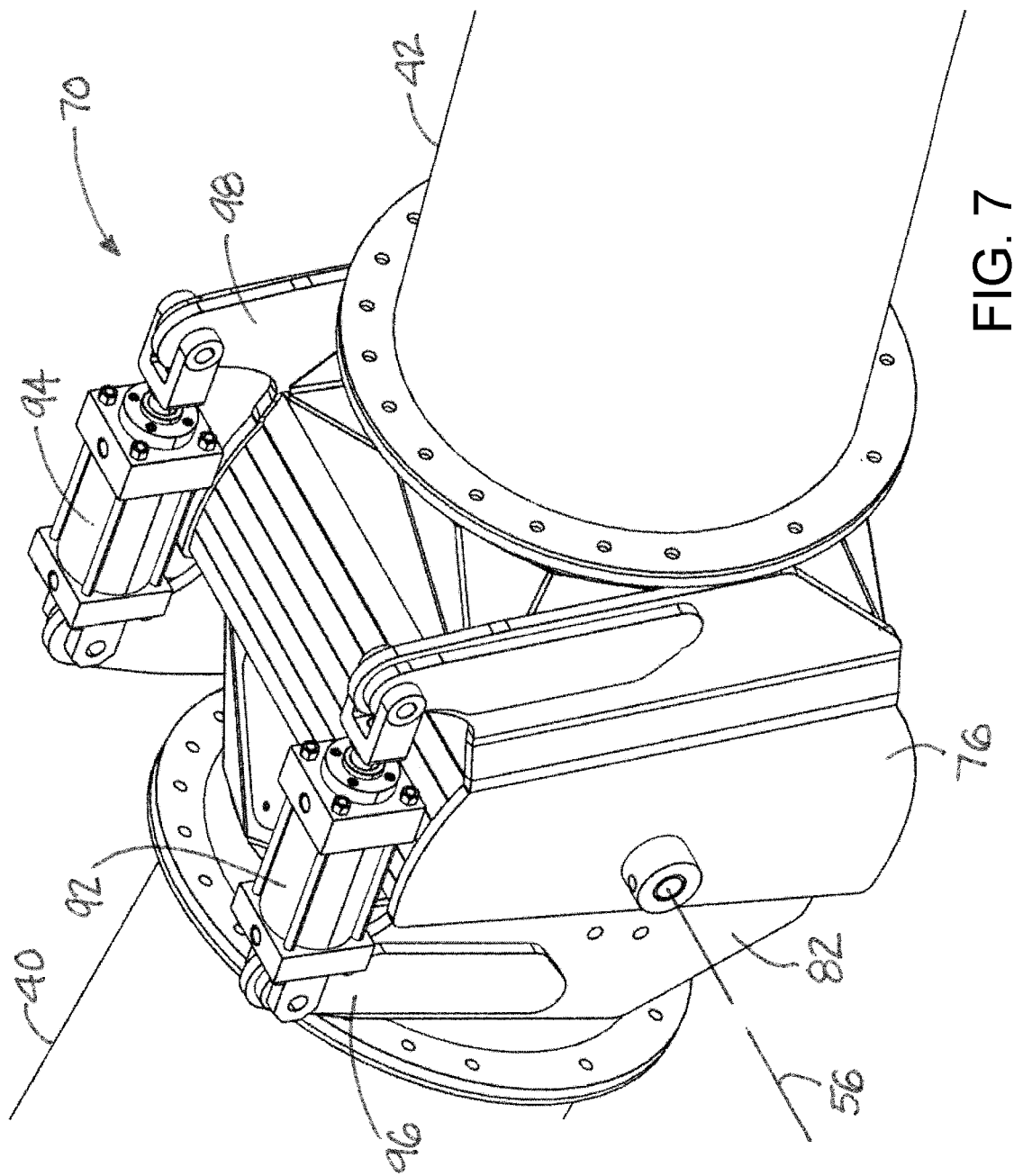
FIG. 7 is a schematic perspective view of the enlarged portion of the auger assembly and the pivot joint structure in the discharge position, according to an illustrative embodiment.
Figure 8:
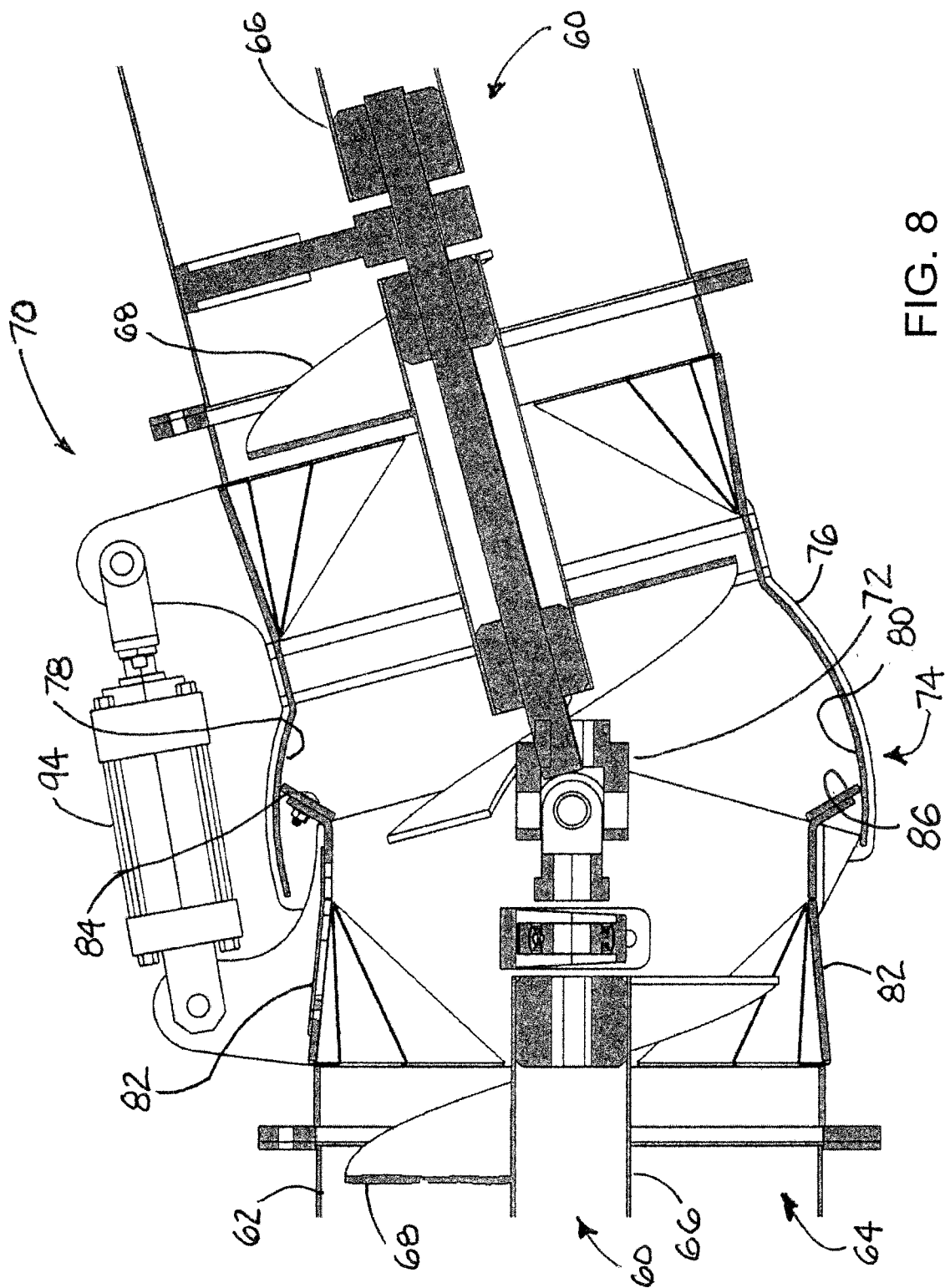
FIG. 8 is a schematic side sectional view of the enlarged portion of the auger assembly and the pivot joint structure in the discharge position, according to an illustrative embodiment.
Figure 9:
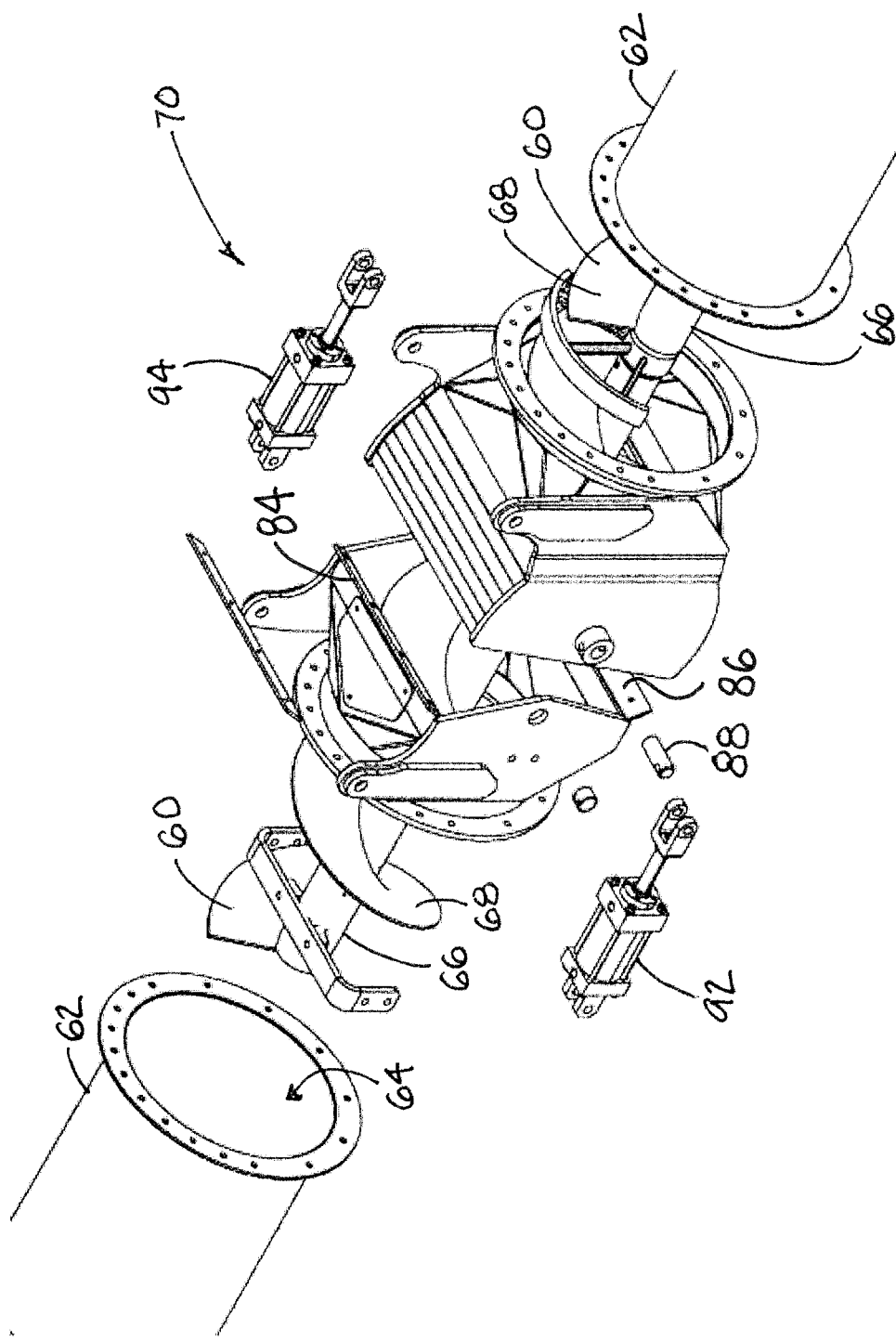
FIG. 9 is a schematic exploded perspective view of the enlarged portion of the auger assembly and the pivot joint structure in the base position, according to an illustrative embodiment.

With reference now to the drawings, and in particular to FIGS. 1 through 10 thereof, a new system for harvesting crop materials in an agricultural field, and in some more advantageous aspects of the disclosure, a system for transferring crop materials from a harvester apparatus in a confined area of an agricultural field, embodying the principles and concepts of the disclosed subject matter will be described.

The applicants recognize that combine harvesters utilize an integrated unload auger to unload or dispense the crop material (e.g., grain) carried by the harvester in onboard storage such as a grain tank or hopper. Conventional unload augers have a folded position in which the length of the auger is oriented substantially parallel to the primary movement direction of the harvester, and typically utilized when an unloading operation is not being performed, as well as an unfolded position in which the length of the auger is oriented substantially perpendicular to the primary movement direction of the harvester, and typically utilized when an unloading operation is being performed. The folded position of the unload auger is typically characterized by the longitudinal axis of the auger being oriented substantially horizontal in order to minimize the overall height of the harvester to, for example, facilitate travel on the road or transport of the harvester on a flatbed trailer. The unfolded position of the unload auger is typically characterized by the longitudinal axis of the auger being angled upwardly such that the auger extends outwardly and upwardly from the rotation point of the auger to provide a higher clearance and reach of the dispensing spout of the auger to fill the hoppers of wagons or trailers, thus permitting the hoppers to have increased height and thus increased capacity. To produce the relatively low vertical profile of the folded position, and the relatively higher vertical reach of the unfolded position, typically the rotation axis of the auger is configured so that the path of the unload auger between the folded and unfolded position lies in an inclined plane that gradually increases the height of the spout while the height of the rotation point remains fixed.

Further, the applicants have also recognized that a number of factors have combined to limit the distance that a harvester apparatus may traverse in an agricultural field between the harvester storage unloading occurrences, and these factors include increases in the size and power of the harvesters which permit corresponding increases in the number of agricultural plant rows that may be harvested by the harvester in a single pass, and increases in the crop yields per acre under advances in farming practices. Moreover, the increase in the density of the crop in the field has far outstripped the typical increases in the grain carrying capacity of the harvester.

These conditions complicate the task of collecting the harvested grain from the harvester, and moving the grain away from the harvester, while the harvester is progressing across the field. A significant spatial challenge arises in areas of the field where standing crop plants are located on both sides of the path of the harvester, such as in the headlands and the opening lands of the field. The aforementioned factors limiting the distance traversed by the harvester between unloading occurrences often mean that the harvester is not able to travel from one end (or headland) of the field to the other end without having to unload the harvester's hopper.

The applicants have also recognized that while wider harvester heads addressing larger numbers of rows has contributed to the challenge by increasing the rate at which the harvester storage is filled, the lateral space cleared by the wider heads may advantageously be utilized to accommodate a grain cart (or other grain transporting vehicle) closely beside the harvester and between the harvester and the standing plants in the field.

To reach the hopper of the close-in positioned grain cart by partially unfolding the auger is not particularly problematic; however, achieving sufficient vertical height for the partially unfolded auger in order for the auger to clear the side of the hopper is a problem, as the partial unfolding of the auger does not permit the auger to raise the spout to the full unloading height that is normally achieved only by fully unfolding the auger. Suitable height of the auger is only achieved by fully or almost fully unfolding the auger, but fully unfolding positions the spout at a lateral location that is typically far beyond the lateral side of the harvester head, and that is often over standing plants in the field not yet reached by the head. With conventional apparatus, this unloading of the onboard storage cannot be achieved without repositioning or deviating the harvester from its forward path across the field.

Illustratively, embodiments of the inventive system may achieve an enhancement of the vertical level of the spout of the auger without having to fully unfold the auger, and may permit the vertical height of the spout to be increased by approximately four feet as compared to the height typically achieved by the spout when only partially unfolded in conventional apparatus.

The disclosure relates to aspects a harvesting system 1 for harvesting and removing crop materials from plants growing an agricultural field, such as, for example, harvesting corn kernels from corn plants growing in the field. The agricultural field has a ground surface 4 from which the plants grow.

In some aspects, the system 1 may comprise: a crop transporting vehicle 2 for transporting harvested crop materials from the agricultural field. The crop transporting vehicle 2 may have a hopper 3 with an upwardly-facing open top for receiving and collecting the crop materials harvested from the field. In some implementations, the crop transporting vehicle 2 may comprise an agricultural tractor and a wagon trailer (see, e.g., FIG. 2), and in other implementations, the transporting vehicle 2 may comprise a semi-tractor and a semi-trailer. Other implementations may also be used, such as a straight truck with an integrated hopper.

In some aspects, the system 1 may further comprise a harvester apparatus 10 for harvesting crop materials from the field, and the apparatus is movable over the ground surface of the field to engage plants growing in the field. The harvester apparatus 10 has a front 12 and a rear 13, and lateral sides 14, 15. The harvester apparatus has a primary movement direction 5, which is generally a forward direction of movement so that the front of the apparatus is oriented toward the direction of movement and so that the rear is oriented away from the direction of movement, and the axis of the primary movement direction may extend forwardly and rearwardly of the harvester apparatus.

An illustrative harvester apparatus 10 may comprise a chassis 16, and may include a frame 18 and body panels mounted on the frame. The body panels may form various elements of the apparatus, such as an onboard storage structure for holding the newly harvested grain. The harvester apparatus 10 may further comprise a harvesting head 20 mounted on the chassis for collecting crop materials from the field. The head 20 is elongated in a direction oriented substantially perpendicular to the primary movement direction 5 of the harvester apparatus, and the head 20 has opposite head ends which are the extremes of the reach of the head.

The harvester apparatus 10 may further comprise a ground contacting mechanism 22 which is mounted on the chassis 16 for moving the apparatus 10 across the ground surface 4. In some embodiments, the ground contacting mechanism 22 may include at least one, and typically two or more, wheels 24. In other embodiments, the ground contacting mechanism 22 may include at least one, and typically two or more, tracks 26. In the illustrative embodiments, the ground contacting mechanism for the apparatus include a pair of tracks toward the front 12 of the apparatus and a pair of wheels at the rear of the apparatus.

In general, the harvester 10 is provided with a crop material conveying structure 30 for conveying the crop materials through the harvester after being severed from the ground and, episodically, from the harvester when desired, such as when the onboard storage structure of the harvester is at or near capacity and the ability to further store material is limited. The conveying structure 30 may include an auger assembly 32 for utilizing in passing the crop materials out of the harvester apparatus and typically to a crop transporting vehicle 3 positioned in proximity to the apparatus 10. The auger assembly is typically elongated along a longitudinal axis 34 and has an inboard end 36 which is maintained close to the chassis and an outboard end 37 which has a dispensing spout 38 to dispensing the material.

The auger assembly 32 is movably mounted on the frame of the harvester 10, and may be mounted to rotate about a rotation axis with respect to the frame and chassis that may be vertically, or substantially vertically, oriented. The inboard end 36 may be rotatably mounted on the frame of the apparatus 10, and may be rotatable with respect to the frame between a folded condition and an unfolded condition. The folded condition may be characterized by the auger assembly 32 being positioned with the longitudinal axis 34 oriented at a transport angle with respect to the primary movement direction 5, and in most implementations the transport angle is characterized by the longitudinal axis being oriented parallel, or substantially parallel, to the primary movement direction 5. The unfolded condition may be characterized by the auger assembly being positioned with the longitudinal axis oriented at an unload angle with respect to the primary movement direction 5. In many implementations, the unload angle is approximately a perpendicular angle. Illustratively, the unload angle may be characterized by being greater than approximately 60 degrees with respect to the primary movement direction 5, and may be further characterized by being between approximately 60 degrees and approximately 90 degrees with respect to the primary movement direction, and in some cases may be greater than 90 degrees and may even extend up to approximately 110 degrees.

Further, the spout 38 of the auger assembly is characterized by having a height above the ground surface 4 on which the harvester apparatus rests. The height of the spout 38 typically varies between the folded and unfolded conditions, and the height in the unfolded condition is greater than the height of the spout in the folded condition. The height of the spout 38 may increase as the spout assembly moves from the folded condition to the unfolded condition, and may do so in a substantially linear path as the unload angle increases.

The auger assembly 32 may include an inboard portion 40 and an outboard portion 42. The inboard portion 40 may be located toward the inboard end 36 and the outboard portion 42 may be located toward the outboard end 37, such that the inboard portion may have the inboard end and the outboard portion may have the outboard end. Each of the inboard 40 and outboard 42 portions may have a central axis 44, 45 extending longitudinally of the respective portion. In greater detail, the inboard portion 40 has a first end 46 and a second end 48, with the second end being opposite of the first end of the inboard portion. The first end 46 of the inboard portion may correspond to the inboard end 36 of the auger assembly. The outboard portion 42 has a first end 50 and a second end 52, with the second end of the outboard portion being opposite of the first end of the outboard portion. The second end 52 of the outboard portion may correspond to the outboard end 37 of the outboard portion. The second end 48 of the inboard portion may be generally located adjacent to the first end 50 of the outboard portion. Each of the inboard 40 and outboard 42 portions may be characterized by a length, and in some illustrative embodiments, the length of the outboard portion may be substantially equal to the length of the inboard portion.

In implementations of the disclosure, the auger assembly 32 has an additional condition, which is an intermediate condition, and the intermediate condition may be characterized by the auger assembly 32 being positioned with the longitudinal axis 34 oriented at an intermediate angle 54 with respect to the primary movement direction 5. The intermediate angle 54 is neither the transport angle or the unload angle, and is less than the unload angle, and is greater than the transport angle. The intermediate angle may be an oblique angle, and in illustrative embodiments, the intermediate angle measures from approximately 15 degrees to approximately 60 degrees with respect to the primary movement direction. In further embodiments, the intermediate angle measures from approximately 15 degrees to approximately 45 degrees with respect to the primary movement direction.

The outboard portion 42 is movable with respect to the inboard portion 40, and in illustrative embodiments, the outboard portion moves with respect to the inboard portion between a base position (e.g., see FIGS. 1, 3, 4, and 9) and a discharge position (e.g., see FIGS. 5, 6, 7, and 8). The base position of the outboard portion 42 may be characterized by the central axes 44, 45 of the inboard and outboard portions being oriented substantially parallel to each other, and the central axes may be being collinear with each other in the base position. The discharge position may be characterized by the central axis of the outboard portion being angled with respect to the inboard portion, and the central axis of the outboard portion may be angled upwardly and away from the ground surface with respect to the central axis of the inboard portion.

In some significant embodiments of the disclosure, the auger assembly 32 may be configured to permit communication between the inboard and outboard portions such that material is able to flow between the portions, and material may be caused to move between the portions. The communication between the portions 40, 42 may be produced in different positions of the outboard portion with respect to the inboard portion. For example, the outboard portion 42 may be in communication with the inboard portion 40 in the discharge position, and in embodiments the outboard portion may be in communication with the inboard portion in the base position. Optionally, the outboard portion 42 may be maintained in communications with the inboard portion in positions between the base and discharge positions to permit operation of the auger assembly in a range of positions between the base and discharge positions.

The outboard portion 42 may be pivotable with respect to the inboard portion 40, and may be pivotable about a pivot axis 56. Illustratively, the pivot axis 56 may have a horizontal, or substantially horizontal, orientation such that the outboard portion is movable in a vertical, or substantially vertical, plane. The central axis 45 of the outboard portion may form a pivot angle 58 with respect to the central axis 44 of the inboard portion. The pivot angle 58 may be an oblique angle, and may be broadly characterized as less than approximately 40 degrees, but usually greater than 0 degrees, and illustratively may range from approximately 10 degrees to approximately 30 degrees.

Illustrative embodiments of the auger portions 40, 42 may include an auger 60 and an auger tube 62, with the auger being positioned in the auger tube in, for example, a concentric relationship with auger tube 62 defining a tube interior 64. The auger 60 may include a central shaft 66 and flighting 68 secured to the shaft 66 such that the shaft and flighting rotate as a unit in the tube interior. At least one of the auger portions 40, 42 may include a support bearing which engages the central shaft 66 to support the auger 60 in the tube interior 64 of the auger tube.

The auger assembly 32 includes a pivot joint, and may further comprise a pivot joint structure 70 positioned between the inboard 40 and outboard 42 portions of the auger assembly. The pivot joint structure 70 may support the outboard portion 42 on the inboard portion 40 of the auger assembly. Illustratively, the pivot joint structure 70 may have a base condition corresponding to the base position of the outboard portion and a discharge condition corresponding to the discharge position of the outboard portion. The pivot structure 70 may be configured to maintain communication between the tube interiors 64 of the inboard and outboard portions in the discharge condition and in the base condition. The communication between the tube interiors of the portions may be substantially particle retentive with boundaries and joints which are substantially particle impermeable in the base and discharge conditions of the structure 70.

In embodiments, the pivot joint structure 70 includes a shaft joint 72 which connects the central shaft 66 of the outboard portion 42 to the shaft of the inboard portion 40 in a manner that is able to transfer the rotation of the shaft 66 of the inboard portion to the shaft of the outboard portion of the auger assembly. Illustratively, the shaft joint 72 may comprise a universal joint, but other suitable joints could be utilized.

The pivot joint structure 70 may also include a pivot shroud 74 which is positioned between the auger tubes 62 of the inboard and outboard portions. The pivot shroud 74 may join the tube interiors 64 of the tubes of the inboard and outboard portions to place the tube interiors in communication with each other. The pivot shroud 74 may comprise an outboard shroud section 76 which extends from the outboard portion and toward the inboard portion, and may be mounted on the first end 50 of the outboard portion. The outboard shroud section 76 may have an upper interior surface 78 and a lower interior surface 80, with each of the interior surfaces being curved about a substantially horizontal axis. Illustratively, the outboard shroud section 76 may form a partial bell housing. In the illustrative embodiments, the outboard shroud section 78 has an outboard flange which is mounted to a flange on the first end 50 of the outboard portion.

The pivot shroud 74 may further include an inboard shroud section 82 which extends from the inboard portion and toward the outboard portion, and may be mounted on the second end 48 of the inboard portion. In embodiments, a part of the inboard shroud section 82 may be positioned in the outboard shroud section 76. The inboard shroud section 82 may have a pair of wiper seals 84, 86, with an upper one 84 of the wiper seals contacting the upper interior surface 78 of the outboard shroud section and a lower one 86 of the wiper seals contacting the lower interior surface 80 of the outboard shroud section. In the illustrative embodiments, the inboard shroud section 82 has an inboard flange mounted to a flange on the second end 48 of the inboard portion, The pivot joint structure 70 may have one or more pivot pins 88 that connect the outboard shroud section 76 to the inboard shroud section 82, and the pivot pins may be positioned along the pivot axis 56 to pivotally connect the portions 40, 42. Further, the pivot joint structure 70 may include at least one pivot actuator 92 which is configured to pivot element of the pivot joint structure to move the outboard portion 42 with respect to the inboard portion 40. Illustratively, a pair of the pivot actuators 92, 94 may be utilized in the structure 70.

The pivot actuator or actuators 92, 94 may be mounted on the inboard and outboard portions, and may be connected to the auger tube of the inboard portion and to the auger tube of the outboard portion. In the illustrative embodiments, the inboard portion 40 is provided with an inboard mounting tab 96 protruding from the auger tube of the inboard portion for mounting each actuator, and the outboard portion 42 is provided with an outboard mounting tab 98 protruding from the auger tube of the outboard portion for mounting each actuator. The pivot actuator or actuators may be mounted on and extend between the mounting tabs 96, 98 of the inboard and outboard portions.

Figure 10:
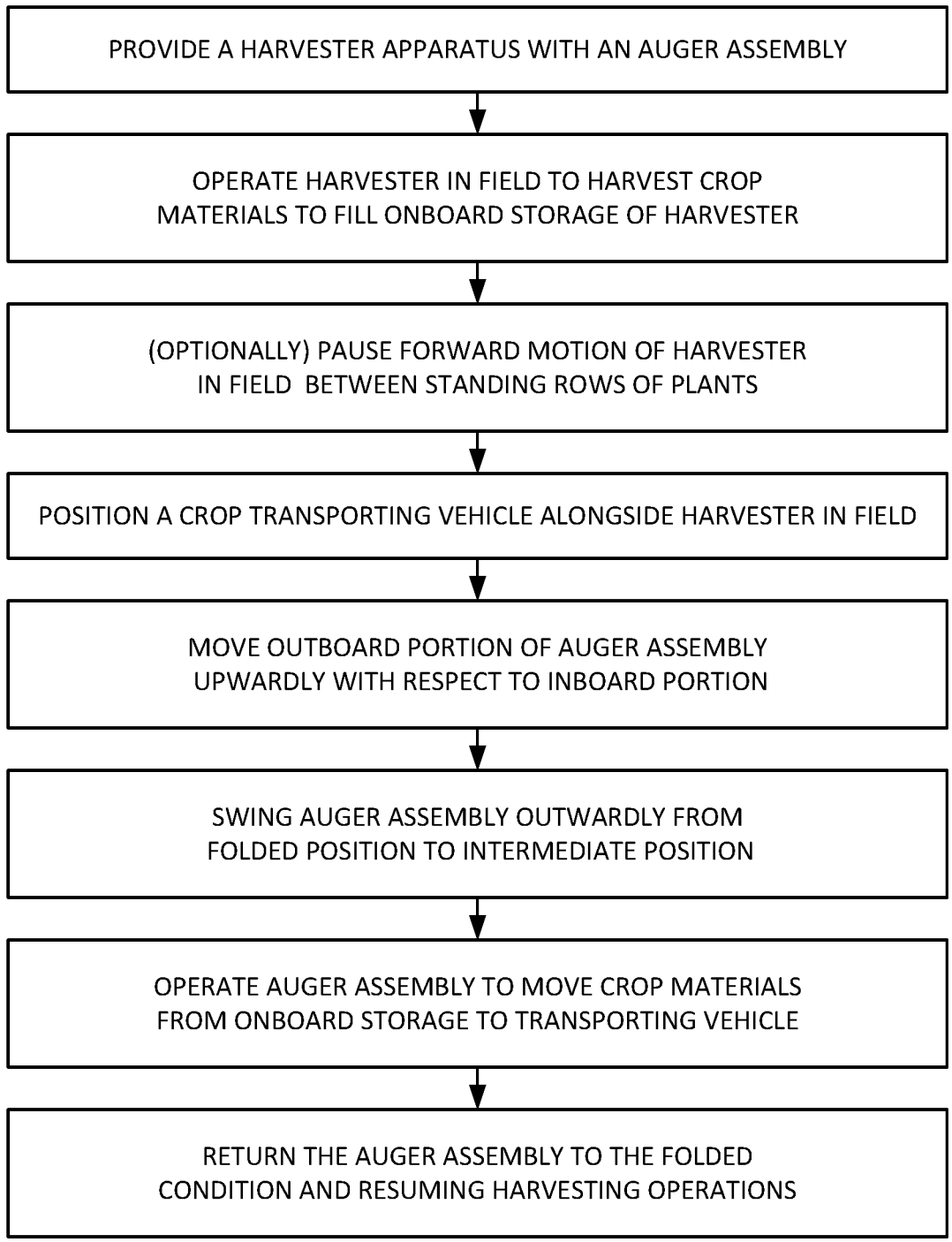
FIG. 10 is a schematic flow diagram of aspects of an illustrative method of utilizing the system of the disclosure.

In another aspect, such as is illustratively implemented in FIG. 10, the disclosure relates to a method of unloading crop materials from a harvester, such as harvester apparatus 10. The method may include providing a harvester apparatus having various aspects of the harvester apparatus 10 disclosed herein, such as the auger assembly 32, and operating the harvester apparatus to fill the onboard crop storage, or grain tank, of the apparatus 10. Operating the harvester apparatus may include moving the harvester apparatus along a path across the ground surface 4 of the field that may be oriented substantially parallel to rows of plants upstanding in the field, although directions of travel skewed with respect to the rows, may also be utilized. For situations where discrete rows do not exist, the movement of the harvester may not have any particular orientation with respect to the upstanding plants. The harvester apparatus may harvest rows of plants from field while moving between other rows of plants upstanding in the field such that rows of plants are upstanding at both lateral ends of the harvester head of the apparatus 10.

The method may further include observing, such as by an operator of the apparatus 10, that grain is to be transferred from the onboard storage of the harvester apparatus to a crop transporting vehicle 2, such as when it is determined that the capacity of the onboard storage has been reached or substantially reached. The method may continue with pausing forward motion of the harvester apparatus in the field, and may include stopping the harvester apparatus along the path between the upstanding rows of plants. In some implementations of the method, forward movement of the harvester may not be paused, and forward movement may continue while unloading of the harvester is performed. Whether pausing or continuing movement, the action may be performed without deviating the harvester apparatus from the path of forward movement while engaging plants, such as deviation by moving the harvester apparatus to an area of the field from which plants have already been harvested or is otherwise free of upstanding plants so that the auger assembly may be fully unfolded and the hopper positioned over the outboard end of the fully unfolded auger.

Further aspects of the method may include positioning a hopper of a crop transporting vehicle 2 in a position in the field alongside the harvester. The position of the vehicle 2 may be rearward of the harvesting head 20 of the harvester, and may further be inside a line extending from one of the outer lateral sides 14, 15 of the harvester head in a rearward direction oriented substantially parallel to the primary movement direction.

The method may also include moving the outboard portion 42 of the auger assembly 32 from the base position to the discharge position. Moving the outboard portion 42 may comprise pivoting the outboard portion 42 upwardly with respect to the inboard portion 40 of the auger assembly. The moving aspect may include actuating one more of the pivot actuators of the pivot joint structure 70 to pivot the outboard portion upwardly.

Additionally, the method may include swinging the auger assembly 32 outwardly from the folded condition toward the unfolded condition and to the intermediate condition. The crop materials may be dispensed from the harvester apparatus, such as by operating the auger assembly 32 to transfer the crop materials from the dispensing spout 38. Operating the auger assembly may include rotating the auger of the inboard and outboard portions, such as by rotating the auger of the inboard portion which in turn causes rotation of the auger of the outboard portion. Those skilled in the art will recognize, in view of this disclosure, that the movement of the inboard and outboard portions and the swinging of the auger assembly to the intermediate condition may be performed in different order of action.

Upon completion of the emptying of the onboard storage of the harvester apparatus, the method may continue with returning the auger assembly to the folded condition including, for example, swinging the auger assembly 32 inwardly from the intermediate condition to the folded condition of the auger assembly and moving the outboard portion of the auger assembly from the discharge position to the base position. The method may further include pivoting the outboard portion downwardly with respect to the inboard portion of the auger assembly which may involve actuating one or more of the pivot actuators of the pivot joint structure to pivot the outboard portion of the auger assembly downwardly. Harvesting using the harvesting apparatus may then be continued with forward movement of the apparatus 10.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 15 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A harvesting system for harvesting and removing crop materials from an agricultural field having a ground surface, the system comprising:
 a harvester apparatus movable over the ground surface of the field for harvesting crop materials from the field, the harvester apparatus defining an onboard storage structure and having a primary movement direction, the harvester apparatus including:
  a crop material conveying structure for conveying the crop materials from the onboard storage structure to a crop transporting vehicle, the conveying structure having an auger assembly elongated along a longitudinal axis with an inboard end and an outboard end, the auger assembly including a dispensing spout at the outboard end, the auger assembly including an inboard portion located toward the inboard end and an outboard portion located toward the outboard end; wherein the outboard portion is movable with respect to the inboard portion between a base position and a discharge position, interiors of the inboard and outboard portions being in communication with each other in at least the base and discharge positions of the outboard portion.

2. The system of claim 1 wherein each of the inboard and outboard portions has a central axis, the base position being characterized by the central axes of the inboard and outboard portions being substantially parallel to each other and the discharge position being characterized by the central axes of the inboard and outboard portions being oriented at an oblique angle with respect to each other.

3. The system of claim 1 wherein the auger assembly is configured to maintain communication between interiors of the inboard and outboard portions while moving between the base and discharge positions.

4. The system of claim 1 wherein each of the inboard and outboard portions has a central axis, the central axis of the outboard portion being angled upwardly with respect to the central axis of the inboard portion in the discharge position.

5. The system of claim 1 wherein the outboard portion is pivotable with respect to the inboard portion about a pivot axis.

6. The system of claim 5 wherein the pivot axis has a substantially horizontal orientation such that the outboard portion is movable in a substantially vertical plane.

7. The system of claim 1 wherein each of the inboard and outboard portions of the auger assembly includes an auger tube and an auger positioned in the auger tube, the auger of the outboard portion being connected to the inboard portion such that rotation of the auger of the inboard portion is transferred to the auger of the outboard portion.

8. The system of claim 1 wherein the auger assembly includes a pivot joint structure between the inboard and outboard portions, the pivot joint structure supporting the outboard portion of the auger assembly on the inboard portion of the auger assembly.

9. The system of claim 8 wherein the pivot joint structure is configured to maintain communication between interiors of the inboard and outboard portions in the base and discharge positions of the outboard portion.

10. The system of claim 1 wherein the harvester apparatus has a frame, the auger assembly being rotatable with respect to the frame about a substantially vertical axis, and the outboard portion of the auger assembly being pivotable with respect to the inboard portion about a substantially horizontal axis.

11. The system of claim 1 wherein the auger assembly is movable between a folded condition and an unfolded condition with respect to a frame of the harvester apparatus, the folded condition being characterized by the longitudinal axis of the auger assembly being oriented substantially parallel to the primary movement direction, the unfolded condition being characterized by the longitudinal axis of the auger assembly being oriented substantially perpendicular to the primary movement direction.

12. The system of claim 11 wherein the auger assembly has an intermediate condition characterized by the longitudinal axis of the auger assembly being positioned at an oblique angle with respect to the primary movement direction.

13. The system of claim 11 wherein the intermediate condition is characterized by the longitudinal axis of the auger assembly being oriented at an unload angle, the unload angle being an acute angle.

14. A conveying structure for conveying particulate material, the conveying structure comprising:
an auger assembly elongated along a longitudinal axis with an inboard end and an outboard end, the auger assembly including a dispensing spout at the outboard end, the auger assembly including an inboard portion located toward the inboard end and an outboard portion located toward the outboard end, each of the inboard and outboard portions having a central axis;
wherein each of the inboard and outboard portions of the auger assembly includes an auger tube and an auger positioned in the auger tube, the auger of the outboard portion being connected to the inboard portion such that rotation of the auger of the inboard portion is transferred to the auger of the outboard portion;
wherein the outboard portion is pivotable with respect to the inboard portion at a pivot joint, a location of the pivot joint between the inboard and outboard ends of the auger assembly being spaced away from the inboard end toward the outboard end and the location of the pivot joint being spaced away from the outboard end toward the inboard end;
wherein the inboard and outboard portions are pivotable between a base position and a discharge position, the base position being characterized by the central axes of the inboard and outboard portions being substantially parallel to each other and the discharge position being characterized by the central axes of the onboard and outboard portions being oriented at an oblique angle with respect to each other;
interiors of the inboard and outboard portions being in communication with each other in at least the base and discharge positions of the outboard portion.

15. The structure of claim 14 wherein the auger assembly includes a pivot joint structure between the inboard and outboard portions, the pivot joint structure supporting the outboard portion of the auger assembly on the inboard portion of the auger assembly.

16. The structure of claim 15 wherein the pivot joint structure is configured to maintain communication between interiors of the inboard and outboard portions in the base and discharge positions of the outboard portion.

17. A harvesting system for harvesting and removing crop materials from an agricultural field having a ground surface, the system comprising:
a harvester apparatus movable over the ground surface of the field for harvesting crop materials from the field, the harvester apparatus defining an onboard storage structure and having a primary movement direction, the harvester apparatus including:
a crop material conveying structure for conveying the crop materials from the onboard storage structure to a crop transporting vehicle, the conveying structure having an auger assembly elongated along a longitudinal axis with an inboard end and an outboard end, the auger assembly including a dispensing spout at the outboard end, the auger assembly including an inboard portion located toward the inboard end and an outboard portion located toward the outboard end;
wherein the outboard portion is movable with respect to the inboard portion between a base position and a discharge position, the base position being characterized by the central axes of the inboard and outboard portions being substantially parallel to each other and the discharge position being characterized by the central axes of the onboard and outboard portions being oriented at an oblique angle with respect to each other; and wherein the auger assembly includes a pivot joint structure between the inboard and outboard portions of the auger assembly, a location of the pivot joint structure between the inboard and outboard portions of the auger assembly being spaced away from the inboard end toward the outboard end and the location of the pivot joint structure being spaced away from the outboard end toward the inboard end;

wherein the pivot joint structure pivots about a substantially horizontal axis such that the dispensing spout is raised by pivot movement of the outboard portion on the pivot joint toward the discharge position and the spout is lowered by pivot movement of the outboard portion on the pivot joint toward the base position; and wherein interiors of the inboard and outboard portions being in communication with each other in at least the base and discharge positions of the outboard portion.

18. The system of claim 1 wherein the harvester apparatus has a frame, the inboard portion of the auger assembly being pivotable with respect to the frame in a substantially horizontal plane.

19. The system of claim 18 wherein the outboard portion of the auger assembly is pivotable about a substantially horizontal axis in a substantially vertical plane with respect to the inboard portion of the auger assembly to raise the dispensing spout with respect to the frame without raising the inboard portion of the auger assembly.

20. The system of claim 1 wherein the harvester apparatus has a frame, the inboard and outboard portions of the auger assembly being movable as a unit about a substantially vertical axis with respect to the frame.

21. The system of claim 1 wherein the auger assembly includes a pivot joint structure joining the inboard and outboard portions, the pivot joint structure having a base condition corresponding to the base position of the outboard portion and a discharge condition corresponding to the discharge position of the outboard portion, the pivot joint structure being configured to maintain communication between a tube interior of the outboard portion with a tube interior of the inboard portion in the discharge condition and in the base condition.

22. The system of claim 1 wherein the auger assembly includes a pivot joint structure joining the inboard and outboard portions such that the pivot joint structure supports the outboard portion of the auger assembly on the inboard portion of the auger assembly; and wherein a location of the pivot joint structure on the auger assembly is spaced away from the inboard end toward the outboard end and wherein the location of the pivot joint structure is spaced away from the outboard end toward the inboard end.

23. The system of claim 1 wherein each of the inboard and outboard portions has a central axis and a length measured along the central axis of the respective portion; and wherein the length of the outboard portion is substantially equal to the length of the inboard portion.

* * * * *